(12) United States Patent
Matsunami et al.

(10) Patent No.: US 7,231,491 B2
(45) Date of Patent: *Jun. 12, 2007

(54) STORAGE SYSTEM AND METHOD USING INTERFACE CONTROL DEVICES OF DIFFERENT TYPES

(75) Inventors: Naoto Matsunami, Hayama (JP); Manabu Kitamura, Yokohama (JP); Koji Sonoda, Sagamihara (JP); Shizuo Yokohata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/934,834

(22) Filed: Sep. 2, 2004

(65) Prior Publication Data

US 2005/0033915 A1 Feb. 10, 2005

Related U.S. Application Data

(63) Continuation of application No. 10/223,857, filed on Aug. 19, 2002, now Pat. No. 6,810,462.

(30) Foreign Application Priority Data

Apr. 26, 2002 (JP) .............................. 2002-125172

(51) Int. Cl.
*G06F 12/00* (2006.01)

(52) U.S. Cl. ........................................ 711/112; 710/74

(58) Field of Classification Search ................ 711/4–6, 711/112, 114–115, 161–162, 170–173, 202–207; 709/201–203
See application file for complete search history.

(56) References Cited

U.S. PATENT DOCUMENTS

| | | | |
|---|---|---|---|
| 4,310,883 A * | 1/1982 | Clifton et al. .............. 707/205 |
| 5,193,171 A * | 3/1993 | Shinmura et al. ........... 711/113 |
| 5,606,689 A * | 2/1997 | Nakagawa ................... 707/206 |
| 6,247,077 B1 | 6/2001 | Muller et al. | |
| 6,317,281 B1 | 11/2001 | Ogawa et al. | |
| 6,553,408 B1 | 4/2003 | Merrell et al. | |
| 6,591,335 B1 | 7/2003 | Sade et al. | |
| 6,745,286 B2 * | 6/2004 | Staub et al. ................. 711/114 |
| 6,779,063 B2 | 8/2004 | Yamamoto | |
| 6,782,450 B2 * | 8/2004 | Arnott et al. ................ 711/114 |
| 6,854,034 B1 | 2/2005 | Kitamura et al. | |

(Continued)

FOREIGN PATENT DOCUMENTS

JP 10-333839 12/1998

(Continued)

*Primary Examiner*—Brian R. Peugh
*Assistant Examiner*—Hashem Farrokh
(74) *Attorney, Agent, or Firm*—Townsend and Townsend and Crew LLP

(57) ABSTRACT

A storage has NAS and SAN functions and a high degree of freedom to configure a system to reduce the management and operation cost. The storage includes a plurality of interface slots in which a plurality of interface controllers can be installed, a block I/O interface controller which has SAN functions and which can be installed in the slot, a file I/O interface controller which has NAS functions and which can be installed in the slots, a storage capacity pool including a plurality of disk devices accessible from the interface controllers, and a storage capacity pool controller to control the storage capacity pool.

19 Claims, 11 Drawing Sheets

U.S. PATENT DOCUMENTS

| | | |
|---|---|---|
| 2001/0020254 A1 | 9/2001 | Blumenau et al. |
| 2002/0087780 A1 | 7/2002 | Selkirk et al. |
| 2002/0095602 A1 | 7/2002 | Pherson et al. |
| 2003/0018851 A1 | 1/2003 | Ikeuchi et al. |
| 2003/0079014 A1 | 4/2003 | Lubbers et al. |
| 2003/0191992 A1* | 10/2003 | Kaminsky et al. .......... 714/712 |

FOREIGN PATENT DOCUMENTS

| | | |
|---|---|---|
| JP | 11-167521 A | 8/1999 |
| JP | 2001-142648 | 5/2001 |

* cited by examiner

| Pool# (1310) | RG# (1311) | LDEV# (1312) | CAPACITY (1313) | LV# (1314) | CNO# (1315) | CH# (1316) | S-N SHARING (1317) | S-S SHARING (1318) | N-N SHARING (1319) | USER CLASS (1320) | | | | |
|---|---|---|---|---|---|---|---|---|---|---|---|---|---|---|
| | | | | | | | | | | E | C | D | W | U |
| 0 | 0 | 0 | 10 | LV0 | 1 | CHN0 | R/W | R/W | R/W | R/W | R/W | R/W | R/W | R/W |
| | | 1 | 10 | | 2 | | P | P | P | P | R | R | R/W | R/W |
| | | 2 | 10 | | 3 | | P | P | P | P | R | R | R/W | R/W |
| | | 3 | 10 | LV1 | 1 | CHN1 | P | P | P | P | P | P | R/W | R/W |
| | | 4 | 10 | | 2 | | | | | | | | | |
| | | 5 | 10 | LV2 | 1 | CHN2 | P | P | P | P | P | P | P | R/W |
| | | ... | ... | ... | ... | ... | ... | ... | ... | ... | ... | ... | ... | ... |
| | 1 | 0 | 4 | LV4 | 1 | CHN3 | P | P | P | P | P | P | P | R/W |
| | | 1 | 4 | | 2 | CHN5 | P | P | P | P | P | P | P | R/W |
| | | 2 | 10 | | 3 | | | | | | | | | |
| | | ... | ... | ... | ... | ... | ... | ... | ... | ... | ... | ... | ... | ... |
| 1 | 2 | 0 | 4 | LV7 | 1 | CHF1 | R/W | R/W | R/W | P | P | P | P | R/W |
| | | 1 | 4 | | 2 | | P | P | P | P | P | P | R/W | R/W |
| | | ... | ... | ... | ... | ... | ... | ... | ... | ... | ... | ... | ... | ... |
| | | 6 | 4 | LV8 | 1 | CHN5 | R/W | | | P | R | R/W | R/W | R/W |
| | | 7 | 4 | | 2 | CHF1 | | | | P | | | | |
| | | 8 | 4 | | 3 | | | | | P | P | P | P | R/W |
| | | ... | ... | ... | ... | ... | ... | ... | ... | ... | ... | ... | ... | ... |
| | 3 | 0 | 10 | RESERVED | - | - | R/W | R/W | R/W | R/W | R/W | R/W | R/W | R/W |
| | | 1 | 10 | RESERVED | - | - | R/W | R/W | R/W | R/W | R/W | R/W | R/W | R/W |
| | | 2 | 10 | RESERVED | - | - | R/W | R/W | R/W | R/W | R/W | R/W | R/W | R/W |
| | | 3 | 10 | RESERVED | - | - | R/W | R/W | R/W | R/W | R/W | R/W | R/W | R/W |
| | | 4 | 10 | RESERVED | - | - | R/W | R/W | R/W | R/W | R/W | R/W | R/W | R/W |
| | | ... | ... | ... | ... | ... | ... | ... | ... | ... | ... | ... | ... | ... |

FIG. 10

| SLOT ADDRESS (13100) | CHANNEL ADAPTER ID NO. (13101) | CHANNEL ADAPTER TYPE (13102) | STATE (13103) |
|---|---|---|---|
| 0 | CHN100B0013 | CHN | NORMAL |
| 1 | CN100B0059 | CHN | NORMAL |
| 2 | CHN100B0153 | CHN | NORMAL |
| 3 | CHN500A1936 | CHN | NORMAL |
| 4 | CHN500A1940 | CHN | NORMAL |
| 5 | CHN500A2002 | CHN | NORMAL |
| 6 | CHF500A1234 | CHF | NORMAL |
| 7 | CHF500A2199 | CHF | NORMAL |

CHANNEL ADAPTER MANAGEMENT TABLE 1310

STORAGE SYSTEM AND METHOD USING INTERFACE CONTROL DEVICES OF DIFFERENT TYPES

FIELD OF THE INVENTION

The present invention relates to a storage system used in a computer system.

BACKGROUND OF THE INVENTION

Interfaces to connect a storage system to a computer are mainly classified into two types.

First, a block input/output (I/O) interface is used to conduct I/O operations between a storage system and a computer using a unit of blocks as a data control unit in the storage system. The block I/O interface includes a Fibre Channel, a small computer systems interface (SCSI), and the like.

A network in which a plurality of storage systems having a block I/O interface are connected to a plurality of computers is called a storage area network (SAN). SAN includes a Fibre Channel in many cases. JP-A-10-333839 describes an example of a storage system connected to a storage area network using a Fibre Channel.

Second, a file I/O interface is used to conduct I/O operations between a storage system and a computer using a unit of files recognized by an application program executed by the computer. The file I/O interfaces uses, in many cases, a protocol of a network file system employed by a file server of the prior art.

Particularly, an apparatus in which functions of the file server customized for the storage system are combined with the storage system is called a network attached storage (NAS). The NAS is directly connected to a local area network (LAN) and the like.

In a storage are network (SAN), the computer is connected to the storage system via a high-speed network exclusively constructed for the storage system, the network being separated from a network used to exchange messages between computers. Therefore, in the SAN higher speed data communication can be executed when compared with the NAS connected via the LAN to the computer. Since the SAN adopts the block I/O interface, overhead of protocol processing is lowered when compared with the NAS, and hence a high-speed response can be achieved.

However, since the SAN requires a network system dedicated to the storage system, installation of the SAN requires a higher cost. Therefore, the SAN is primarily used in a backbone system of an enterprise to construct a database in many cases.

On the other hand, since the NAS can directly use an existing LAN, the installation cost thereof is lowered and the installation becomes easier. The NAS uses a standardized network file system and hence the NAS user can manage data in the unit of general files. Therefore, data can be easily managed and files can be easily shared among a plurality of computers.

However, the NAS communicates data with computers via the LAN also used for communications between the computers. There exists risk that the load of the LAN is increased. Since the protocol processing used in the network file system has high overhead and hence the response time becomes longer as compared with the SAN. Therefore, the NAS is primarily used in a file management or control system of an enterprise for application to manage web contents, data files of computer aided design, and the like in many cases.

As above, the NAS and the SAN are complementary to each other and are applied to mutually different fields. Therefore, the NAS and the SAN are respectively used in appropriate fields.

For each computer to use a necessary amount of storage capacity of the storage system according to necessity, there exists a technique called a storage pool in which each resource (to be referred to as a device hereinbelow) of the storage system can be easily set and can be easily allocated to each computer. JP-A-2001-142648 describes an example of the storage pool.

SUMMARY OF THE INVENTION

When it is desired to construct a system including a SAN and a NAS according to the prior art, a NAS and a storage system having functions of the SAN are required. In this case, the user of the constructed system must separately manage or control the storage systems of different types. This results in a problem of increase in the cost for the management and operation of the system.

In the system including both the storage system having the NAS functions and the storage system having the SAN functions, the system user must manage the storage capacity for each storage system. Specifically, for each storage, the user must set an environment configuration and must manage its storage capacity. Consequently, there arises a problem that the management of the storage system becomes complex and difficult.

Assume that the storage capacity of the storage system used by the SAN is insufficient in a system including the SAN and the NAS. In this situation, even if NAS has available or enough storage capacity, the user cannot freely use the storage capacity of the NAS because the respective storage systems are separately or differently managed. That is, there arises a problem that the user cannot efficiently use the total capacity of the overall system.

It is therefore an object of the present invention to provide a storage system capable of reducing the management and operation cost for storage systems of a plurality of types.

Another object of the present invention is to provide a storage system which facilitates the management of the storage capacity of the overall system and which allows efficient use of the storage capacity.

To solve the objects according to the present invention, there is provided a storage system including a plurality of slots in which interface controllers of a plurality of types are installed, a plurality of disk devices, and a device for allocating storage areas of the disk devices to the slots.

The interface controllers of a plurality of types may include a block I/O interface controller having functions of a SAN and a file I/O interface controller having functions of a NAS.

According to a favorable embodiment of the present invention, the interface controllers have the same shape or form.

According to a favorable embodiment of the present invention, the storage system may include a device for allocating a storage area allocated to an interface controller to an interface controller of another type.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram showing a layout of a disk pool information centralized control table;

FIG. 10 is a diagram showing a channel adapter centralized control table;

DESCRIPTION OF THE EMBODIMENTS

Figure 1:
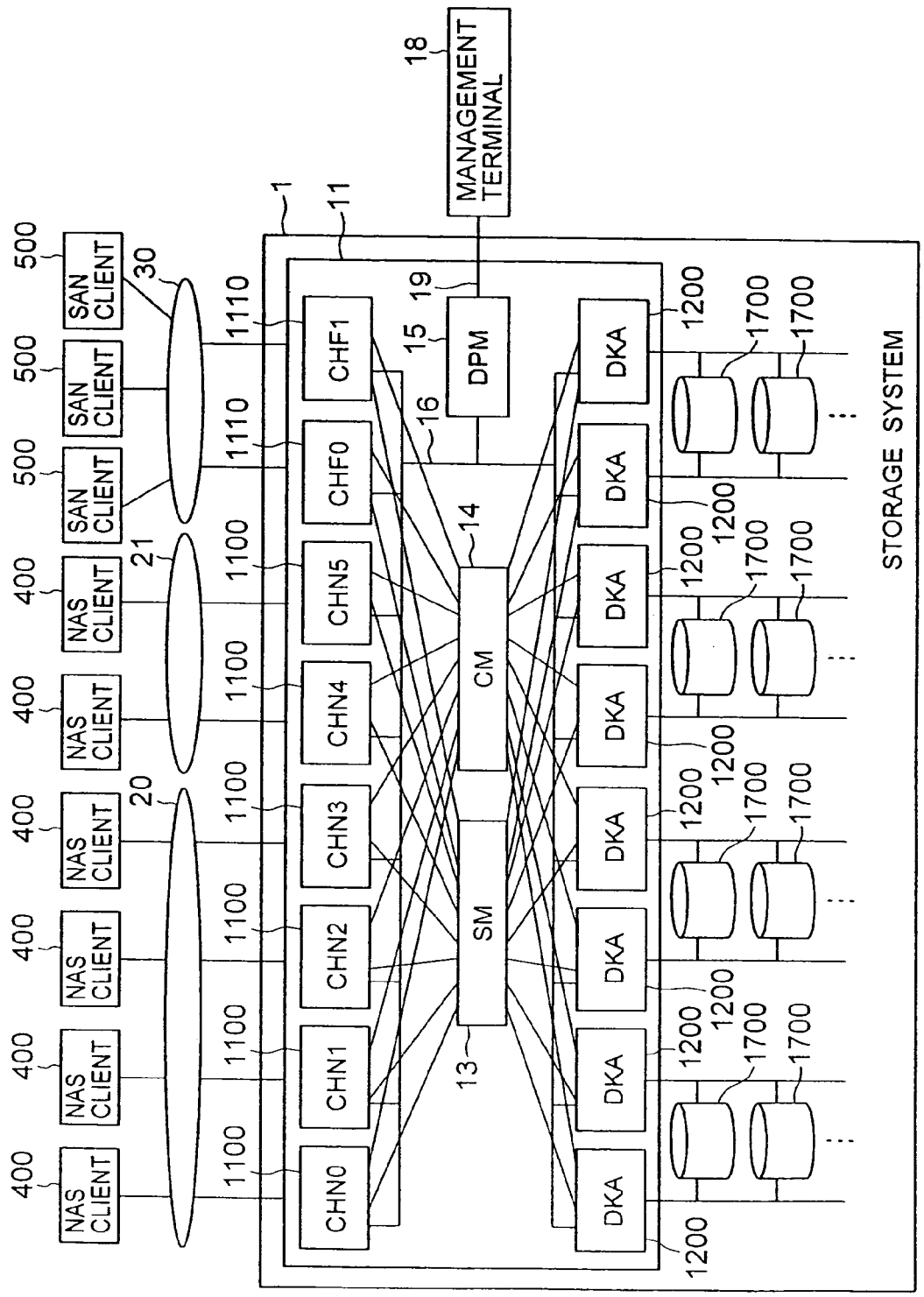
FIG. 1 is a diagram schematically showing a system configuration of an embodiment of the present invention.

FIG. 1 shows an embodiment of a storage system according to the present invention.

The storage system 1 is connected via an LAN 20 and an LAN 21 to NAS clients 400. In the embodiment, each of the LAN 20 and 21 is an internet protocol (IP) network (to be simply referred to as a network hereinbelow). The storage system 1 is also connected via a SAN 30 to SAN clients 500. In the embodiment, the SAN 30 includes a Fibre Channel.

The storage system 1 is connected to a management terminal 18. The terminal 18 includes input/output devices such as a display to present various kinds of information to the user and a keyboard and a mouse for the user to input information. The terminal 18 can communicate via a communication network 19 with the storage system 1 and is operated by the user to conduct various setting operations of the storage system 1.

As above, the storage system 1 is a storage system including the SAN which includes the Fibre Channel and which uses the block I/O interface and the NAS which includes the IP networks and which uses the file I/O interface. That is, the storage system 1 includes different type interfaces.

Any combination of the interface for SAN and the interface for NAS is available for the storage system 1. As one combination, the system 1 may be configured with the interface only for SAN or NAS.

The storage system 1 includes a disk controller (to be abbreviated as DKC hereinbelow) 11 and storage devices (to be referred to as disks hereinbelow) 1700.

The disk controller 11 includes network channel adapters (CHN) 1100, and Fibre Channel adapters (CHF) 1110, disk adapters (DKA) 1200, a shared memory (SM) 13, a cache memory (CM) 14, and a disk pool manager (DPM) 15.

The network channel adapter 1100 is an interface controller connected via the file I/O interface to NAS clients 400. The Fibre Channel adapter 1110 is an interface controller connected via the block I/O interface to SAN clients 500. The adapters 1100 and 1200 will be collectively referred to as channel adapters (CH) hereinbelow.

The disk adapter 1200 is connected to disks 1700. The disk adapter 1200 controls data transfer between disks connected thereto and associated clients. The shared memory 13 stores configuration control information to control the configuration of the storage system 1, control information of the cache memory 14, and the like. Data stored in the shared memory 13 is shared among all channel adapters and disk adapters. The cache memory 14 temporarily stores data of the disk 1700. The cache memory 14 is also shared among all channel adapters and disk adapters.

In the storage system 1, any channel adapter can access the cache memory 14 and all disks 1700. Such a configuration can be constructed using, for example, a crossbar switch.

The disk pool manager (DPM) 15 manages all disks 1700 in a centralized fashion. Concretely, the manager 15 stores information to regard the overall storage capacity of the disks 1700 as one disk pool. The channel adapters, the disk adapters, and disk pool manager 15 are mutually connected to each other via a management or control network 16. The disk pool manager 15 is connected via the communication network 19 to the manager terminal 18.

Figure 2:
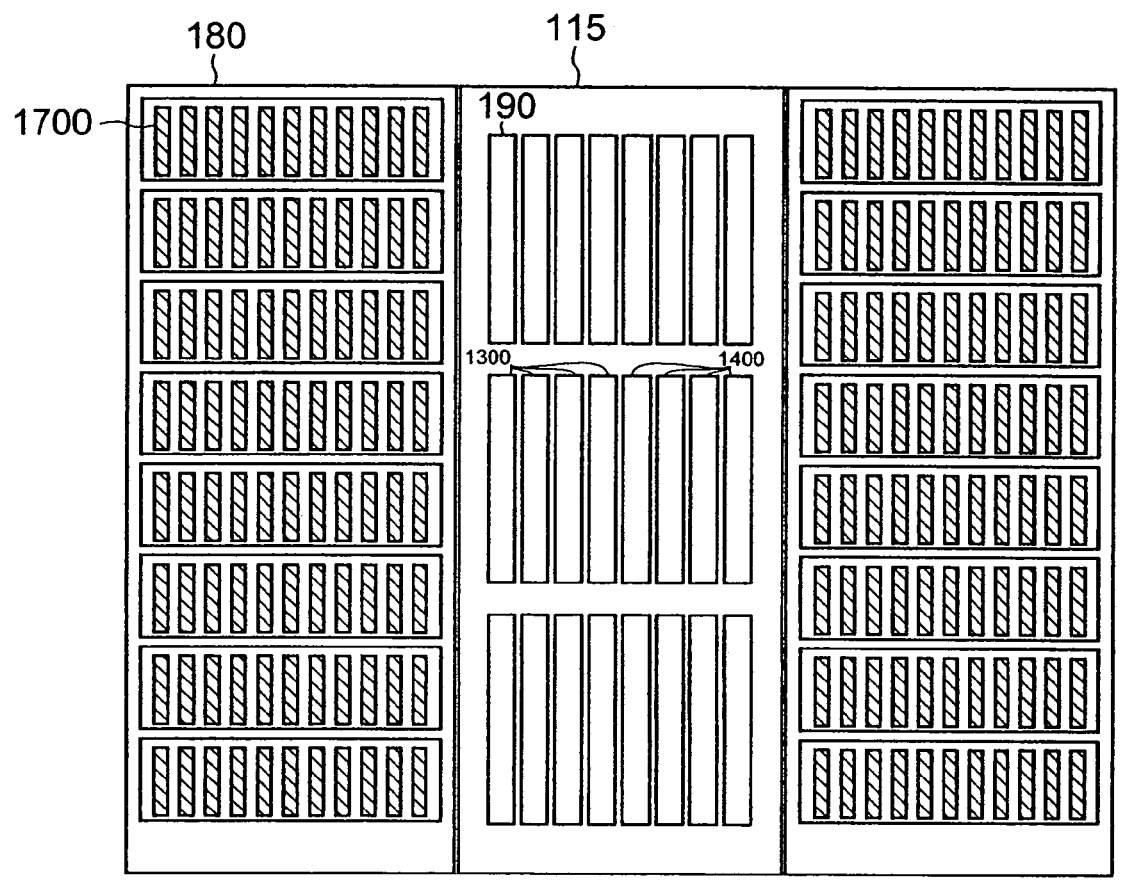
FIG. 2 is a schematic diagram showing a system configuration of an embodiment of the present invention.

FIG. 2 shows an appearance of the storage system 1.

A DKC cabinet 115 is disposed to store the CHN 1100, the CHF 1110, the DKA 1200, the SM 13, and the CM 14. A disk unit cabinet (DKU) 180 is used to store disks 1700. The shared memory 13 actually includes a plurality of controller boards 1300. The cache memory 14 also includes a plurality of cache boards 1400. The user of the storage system 1 obtains desired storage capacity by adjusting the number of cache boards 1400 and disks 1700.

The DKC cabinet 115 includes a plurality of interface adapter slots 190. Each slot 190 is used to install an adapter board in which a channel adapter 1100 and the like are mounted is installed. In the embodiment, the interface adapter slots 190 have the same form, the adapter boards have the same size, and the connectors have the same form regardless of the interface types to keep compatibility of interface adapters of various types. Therefore, any kinds of adapter board can be installed in the slot 190 of the DKC cabinet 115 regardless of the interface type.

The user of the storage system 1 can install any combination of the numbers of adapter boards, CHN 1100 and CHF 1110 in the adapter slots 190 of the storage system 1. The user therefore can freely configure the interface of the storage system 1.

Figure 3:
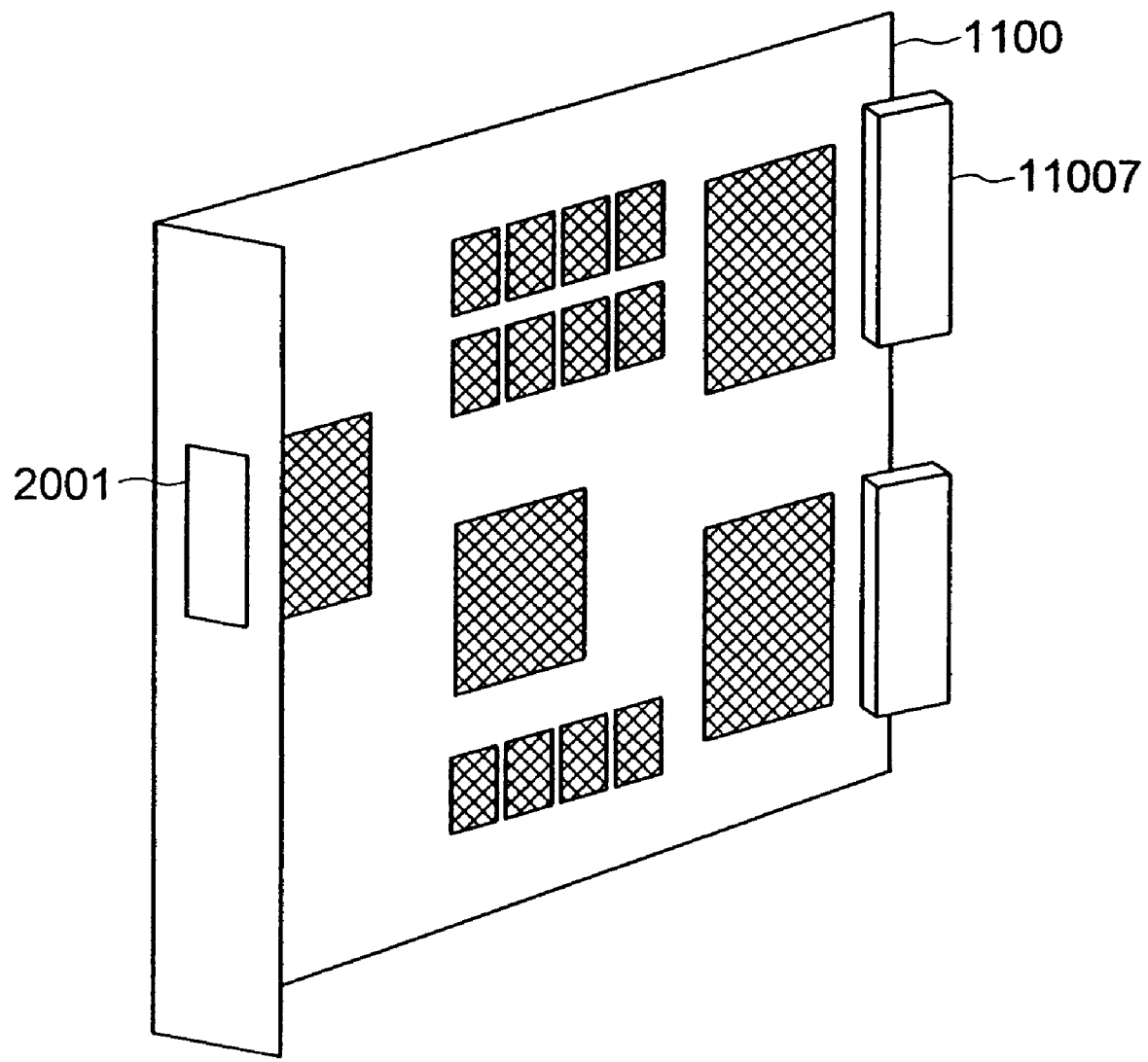
FIG. 3 is a perspective view of a channel adapter.

FIG. 3 shows a configuration of an adapter board with a channel adapter 1100. A connector 11007 is used to establish connection to a connector of the DKC cabinet 115. In the embodiment, the adapters 1100 and 1110 have the same form as described above. For the adapter board of a network channel adapter, an interface connector 2001 is associated with the LAN. For the adapter board of a Fibre Channel adapter 1110, the interface connector 2001 corresponds to a Fibre Channel.

Figure 4:
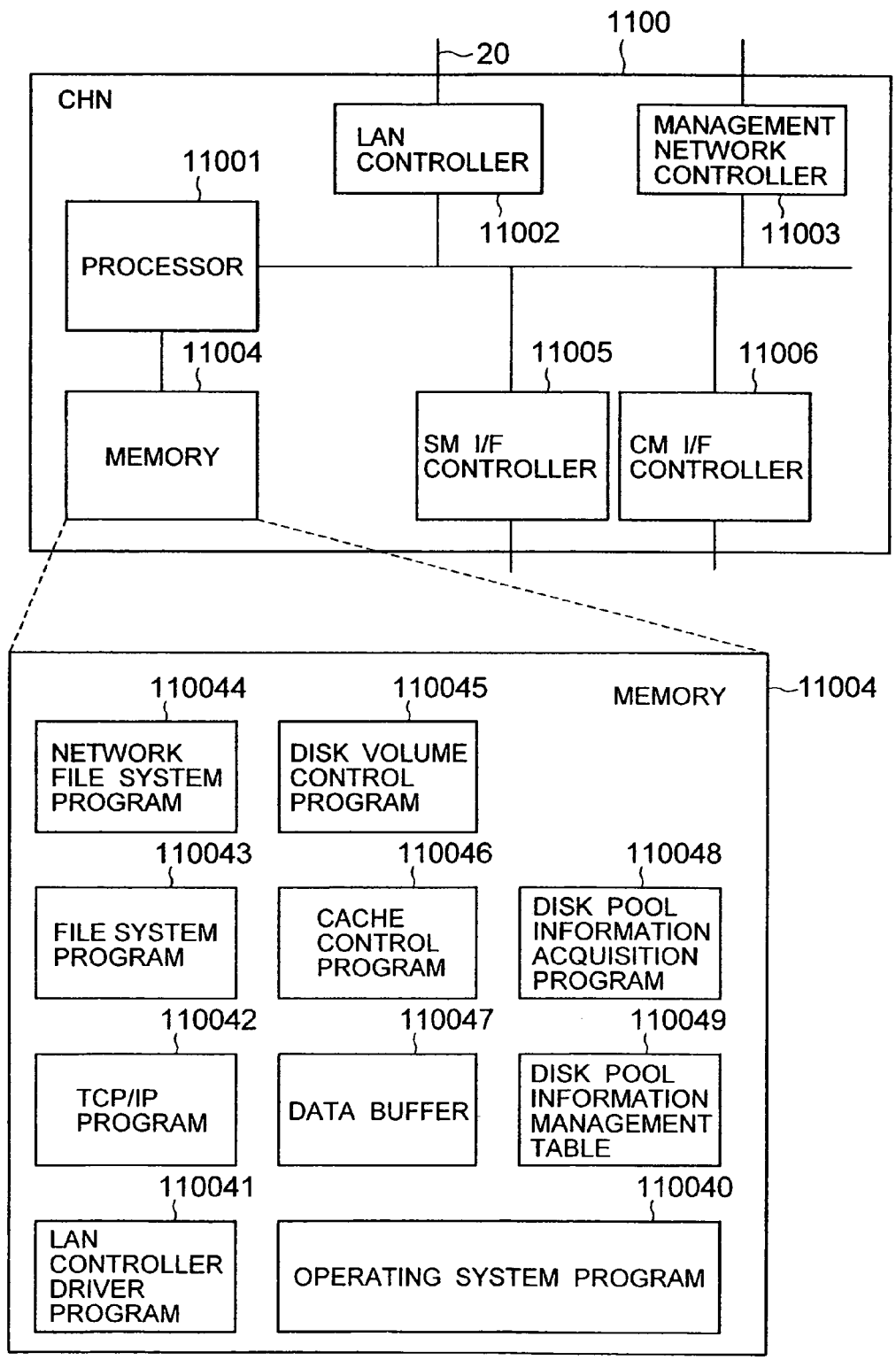
FIG. 4 is a block diagram showing a configuration of a network channel adapter (CHN)

FIG. 4 shows an internal configuration of the network channel adapter 1100. The adapter 1100 includes a processor 11001, an LAN controller 11002, a management network controller 11003, a memory 11004, an SM interface (I/F) controller 11005, and a CM I/F controller 11006.

The processor 11001 controls overall operation of the adapter 1100. The LAN controller 11002 controls communication between the adapter and the LAN. The management network controller 11003 controls communication between the adapter 1100 and the management network 16. The memory 11004 connected to the processor 11001 stores programs to be executed by the processor 11001 and control data.

The SM I/F controller 11005 controls data transfer between the adapter 1100 and the shared memory 13. The CM I/F controller 11006 controls data transfer between the adapter 1100 and the cache memory 14.

The memory 11004 stores an operating system program 110040, an LAN controller driver program 110041, a TCP/IP program 110042, a file system program 110043, a network file system program 110044, a disk volume control program 110045, a cache control program 110046, a disk pool information acquisition program 110048 and a disk pool information management table 110049. The memory 11004 also includes a data buffer 110047.

The operating system program 110040 manages the programs stored in the memory 11004 and controls input and output operations. The LAN controller driver program 110041 controls the LAN controller 11002. The TCP/IP program 110042 controls the communication protocol, namely, TCP/IP on the LAN. The file system program 110043 manages the files stored on the disks 1700.

The network file system program 110044 controls the protocol of the network file system to supply files from the disks 1700 to the NAS clients 400. The disk volume control program 110045 controls accesses to disk volumes set to the disks 1700. The cache control program 110046 manages data stored in the cache memory 14 and controls to judge a data hit/miss condition and the like in the cache memory 14.

The disk pool information acquisition program 110048 is executed when any one of the channel adapters 1100 acquires information of the disk pool stored in the shared memory 13. The disk pool information management table 110049 stores disk pool information obtained as a result. The data buffer 110047 adjusts a data transfer speed between the NAS clients 400 and the cache memory 14 and is used to store file data in the cache memory 14.

The processor 11001 may be a single processor or a set of a plurality of processors. For example, the processor 11001 may be configured as a symmetric multiprocessor for horizontal load balancing of control processing. The processor 11001 may also be configured as an asymmetric multiprocessor in which a processor executes network file system protocol processing of the file I/O interface and another processor controls disk volumes. Alternatively, the processor 11001 may also be configured as a combination of these configurations.

Figure 5:
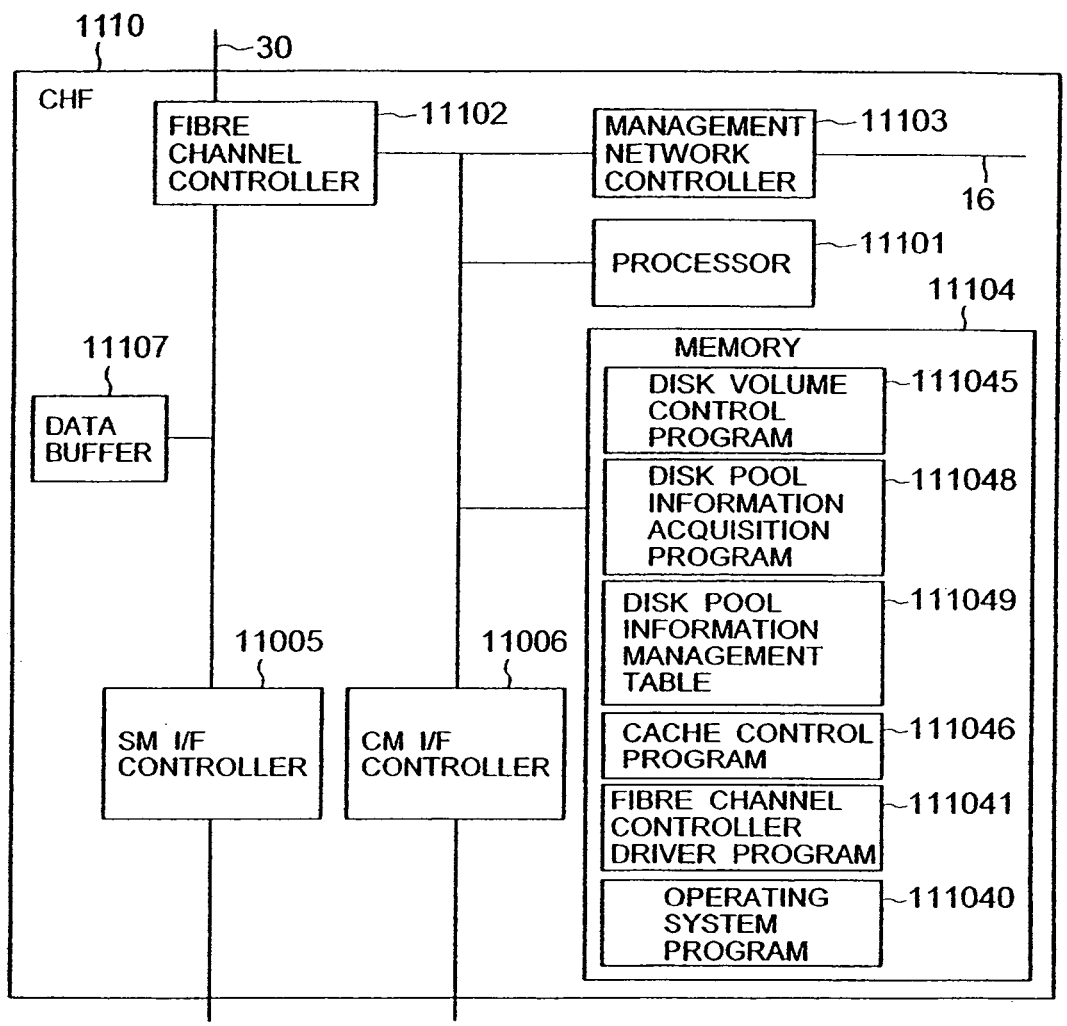
FIG. 5 is a block diagram showing a configuration of a Fibre Channel adapter board (CHF)

FIG. 5 shows an internal configuration of the Fibre Channel adapter 1110. The adapter 1110 includes a processor 11101, a Fibre Channel controller 11102, a management network controller 11103, a memory 11104, an SM controller 11005, a CM controller 11006, and a data buffer 1107.

The processor 11101 controls overall operation of the adapter 1110. The Fibre Channel controller 11102 controls communication between the adapter 1110 and the SAN. The management network controller 11103 controls communication between the adapter 1110 and the management network 16. The memory 11104 connected to the processor 11101 stores programs to be executed by the processor 11101 and control data.

The SM controller 11005 controls data transfer between the network channel adapter 1100 and the SM 13. The CM controller 11006 controls data transfer between the network channel adapter 1100 and the CM 14. The data buffer 11107 serves as a buffer memory to minimize the difference of data transfer speed between the SAN clients 500 and the cache memory 14.

The memory 11104 stores a Fibre Channel controller driver program 111041, an operating system program 111040, a disk volume control program 111045, a cache control program 110046, a disk pool information acquisition program 111048, and a disk pool information management table 111049.

The Fibre Channel controller driver program 111041 controls the Fibre Channel controller 11002. The other programs are almost equal in their functions as those stored in the memory of the network channel adapter 1100 shown in FIG. 4 and hence description thereof will be avoided.

Like the processor 11001 of the network channel adapter 1100, the processor 11101 may also be configured as a single processor or a multiprocessor.

Figure 6:
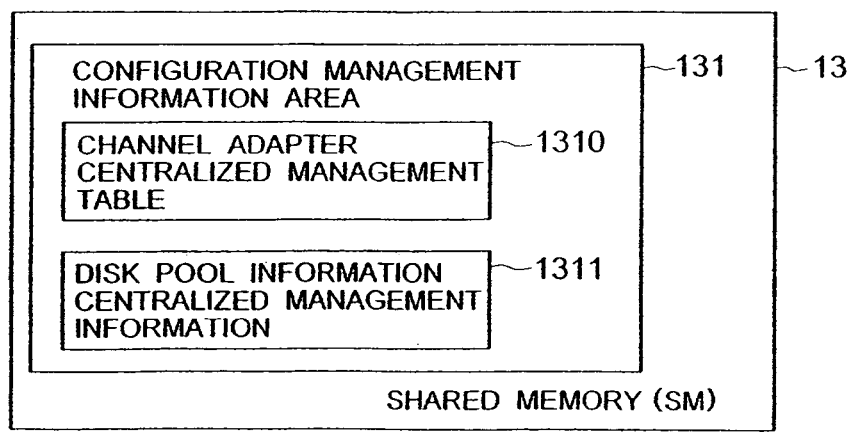
FIG. 6 is a diagram showing a configuration of a shared memory (SM)

FIG. 6 shows a layout of the shared memory 13. The memory 13 includes a configuration managing information area 131. The area 131 includes a channel adapter centralized management table 1310 and a disk pool information centralized management table 1311. Although the memory 13 stores information of all configurations of the storage system 1, description thereof will be avoided in conjunction with the embodiment.

The channel adapter centralized management table 1310 stores management information of all channel adapters of the storage system 1. Details of the table 1310 will be described later. The table 1311 stores management information of a disk pool 6 which is a virtual storage area configured by all disks 1700 of the storage system 1.

Figure 7:
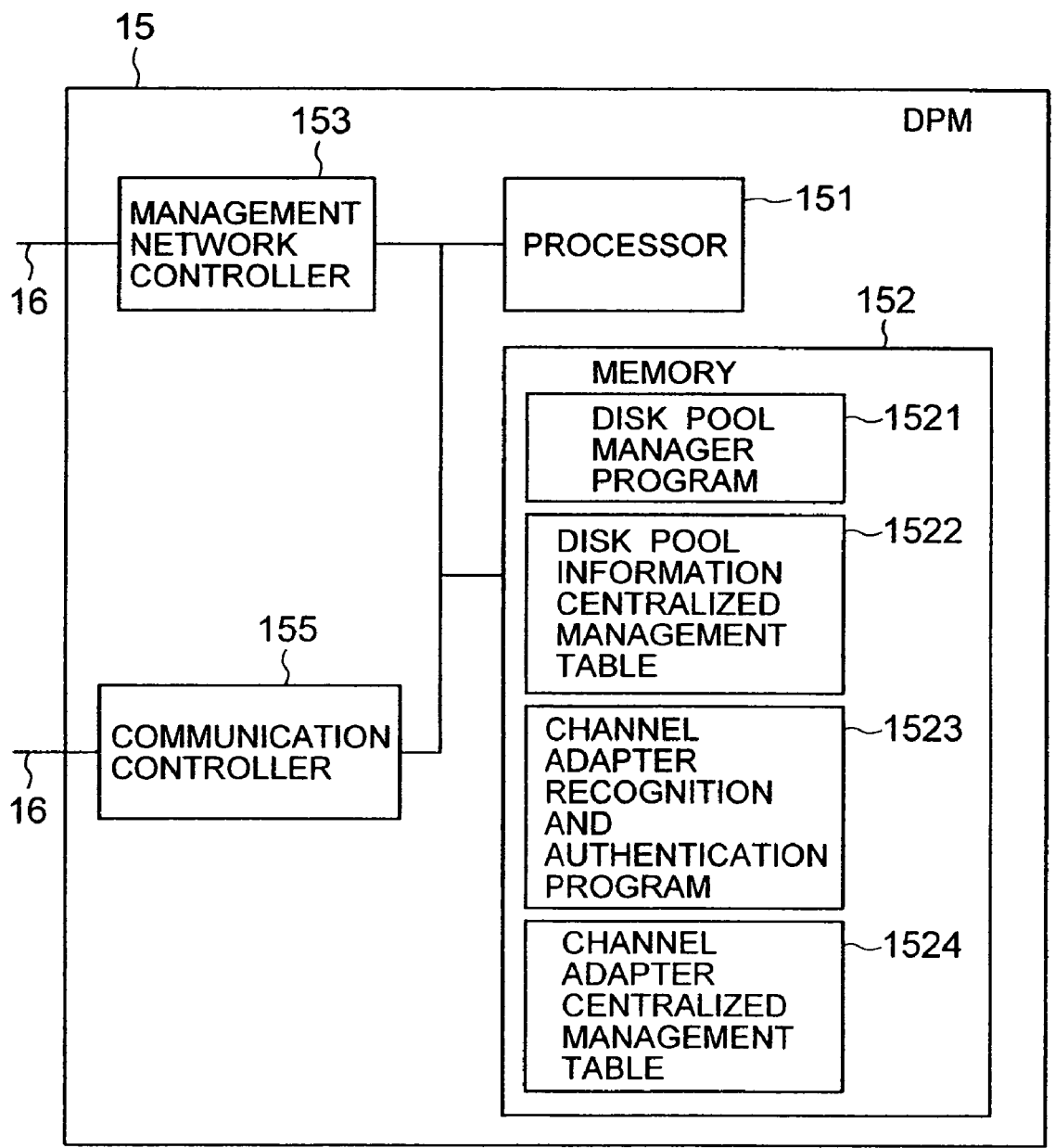
FIG. 7 is a block diagram showing a configuration of a disk pool controller.

FIG. 7 shows an internal configuration of the disk pool manager 15. The manager 15 includes a processor 151, a memory 152, a management network controller 153, and a communication controller 155.

The processor 151 controls overall operation of the disk pool manager 15. The memory 152 stores control programs executed by the processor 151 and data used for control. The management network controller 153 controls data transfer between the disk pool manager 15 and the other devices of the disk controller 11. The communication controller 19 controls data transfer between the management terminal 18 and the disk pool manager 15.

The memory 152 stores a disk pool manager program 1521, a disk pool information centralized management table 1522, a channel adapter recognition and authentication manager program 1523, and a channel adapter centralized management table 1524.

The disk pool manager program 1521 is executed when the storage system 1 configures and manages the disk pool 6 using the disks 1700. The channel adapter recognition and authentication manager program 1523 is executed when the storage system 1 senses a state of installation of the channel adapters 1100 and 1110 to confirm normal operation thereof.

The disk pool information centralized management table 1522 stores information for the disk pool manager program 1521 to manage the disk pool 6 thus constructed and information to manage allocation of storage areas of the disk pool to the respective channel adapters. The contents of the table 1522 are basically the same as those of the table 1311 stored in the shared memory 13.

The channel adapter centralized management table 1524 stores information of channel adapters sensed and authenticated by the manager program 1523. The contents of the table 1524 are basically the same as those of the channel adapter centralized management table 1310 stored in the shared memory 13.

Figure 8:
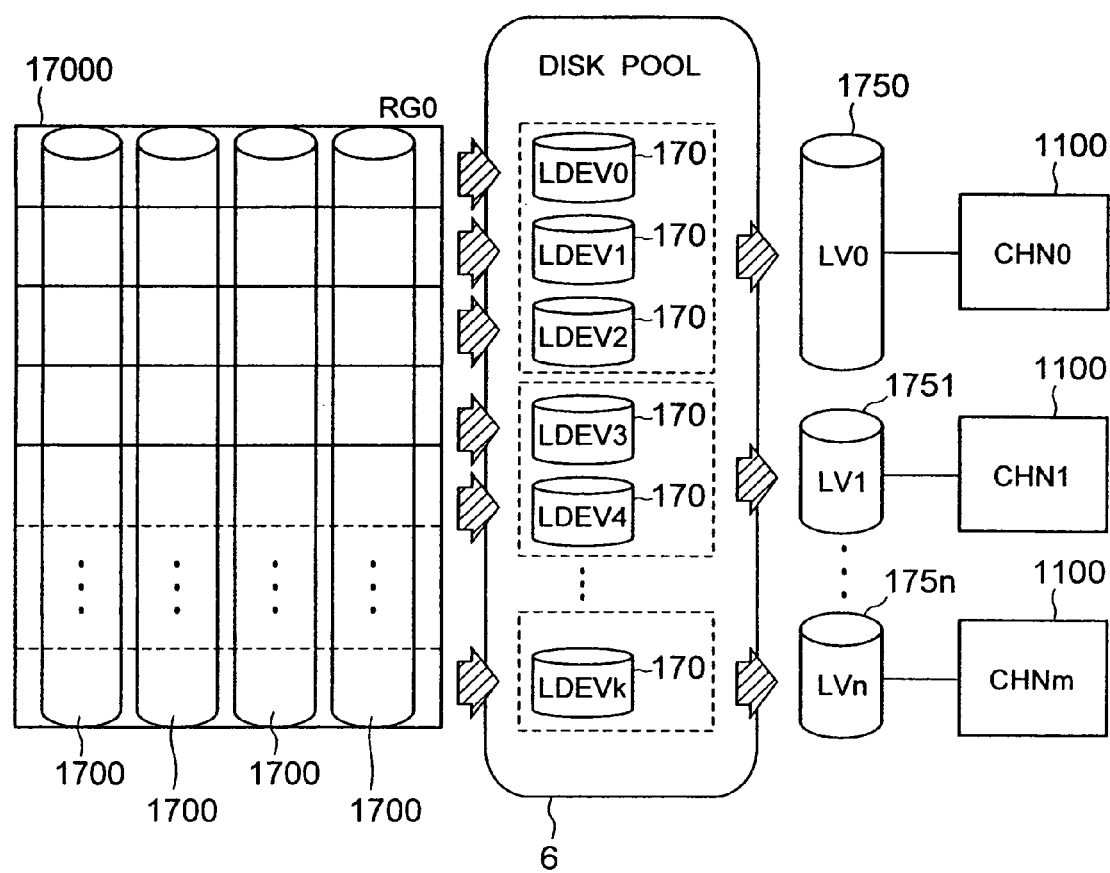
FIG. 8 is a schematic diagram showing a configuration of a disk pool.

FIG. 8 shows a configuration of the disk pool 6.

The disk pool 6 is a set of storage areas of a plurality of disks 1700 defined as one virtual storage area.

A plurality of disk pools 6 may be set to the storage system 1. Specifically, according to the difference in the characteristic of the disk devices, for example, performance thereof (rotating speed of 7200 rpm or 15000 rpm) or redundancy (RAID1 or RAID5) of the disk group, a disk pool may be set for each of a group of disks having the same characteristic. Alternatively, a disk pool may be set for each group of users (user group) using the storage system.

The disk pool may include an arbitrary number of disks 1700. By adjusting the number thereof according to necessity, the user can change the storage capacity of the disk pool 6.

FIG. 8 shows a specific example of a correspondence between one disk pool 6 and a plurality of disks 1700, concretely, RAID group (RG) 17000. The RG 17000 is redundant arrays of independent disks (RAID) including a plurality of disks 1700.

The storage areas allocated to one disk pool 6 are divided into a plurality of logical devices (LDEV) 170. A plurality of LDEV 170 are collectively defined as a volume, i.e., a logical volume (LV) 1750.

In FIG. 8, an RG 17000 (RG 0) including four disks 1700 is allocated to one disk pool 6. The storage capacity of the RG 0 is subdivided into LDEV 0 to LDEV k each of which has a storage capacity of L. A set including LDEV 0 to LDEV 2 configures one LV 0. Similarly, a set of LDEV 3 and LDEV 4 configures one LV 1 (1751). In this way, several LV are similarly constructed. In FIG. 8, the LV0 and the LV1 are respectively allocated to the CHN 0 and the CHN 2. The LDEV may correspond to one stripe size of the RAID.

FIG. 9 shows a layout of the disk pool information centralized management table 1311 stored in the shared memory 13. The table 1311 is substantially equal in structure to the disk pool information centralized management table 1522 stored in the disk pool manager 15. Description will now given of the disk pool information centralized management table 1311.

The table 1311 includes an entry 13110 for a number assigned to the disk pool 6, an entry 1311 for a number assigned to the RG 17000, an entry 1312 for a number assigned to the LDEV 170, an entry 1313 for information of the capacity of the LDEV 170, an entry 1314 for a number assigned to the logical volume (LV), a CN entry 1315 for a sequence number of the LDEV 170 of the LV, an entry 1316 for a number of a channel adapter to which an associated LV is assigned, and entry 1317 for an S-N sharing information indicating possibility of sharing of the channel adapter with respect to the disk pool 6, RG, and LV, namely, between SAN (CHF) and NAS (CHN); an entry 1318 for S-S sharing information indicating possibility of sharing between SAN adapters (CHFs), an entry 1319 for N-N sharing information indicating possibility of sharing between NAS adapters (CHNs), and an entry 1320 for user class sharing information. The sharing information between a plurality of CHs (to be referred to as intra-CH sharing information hereinbelow) and the like will be described later. The CN is a number indicating a sequence of connection when a plurality of LDEV 170 are connected to each other to create a logical volume.

The storage system 1 confirms the RG 17000 and LDEV 170 constituting the disk pool 6 according to the information registered to the table 1311. The storage system 1 also confirms, according to the information registered to the table 1311, to which one of the channel adapters the LDEV 170 is allocated and available storage capacity of the disk pool 6.

FIG. 10 shows a configuration of the channel adapter centralized management table 1310 stored in the cache memory 13. The table 1310 is substantially equal in structure to the channel adapter centralized management table 1524 of the disk pool manager 15.

The table 1310 includes an entry 13100 for an address of a channel adapter in the management network 16, the channel adapter being installed in the storage system 1, an entry 13101 for an identifier number of the channel adapter, an entry 13102 for information of a type of the channel adapter, and an entry 13103 for information of a state of operation of the channel adapter.

Description will next be given of operation of the storage system in the embodiment of the present invention. The storage system mainly conducts two operations as below.
(A) Volume allocation processing
(B) Volume recognition processing The volume allocation processing of (A) is processing in which the storage system 1 allocates a storage capacity of the disk pool 6 as a logical volume to the channel adapter.

The volume recognition processing of (B) is processing in which a channel adapter of the storage system 1 recognizes a logical volume allocated to the channel adapter.

Figure 11:
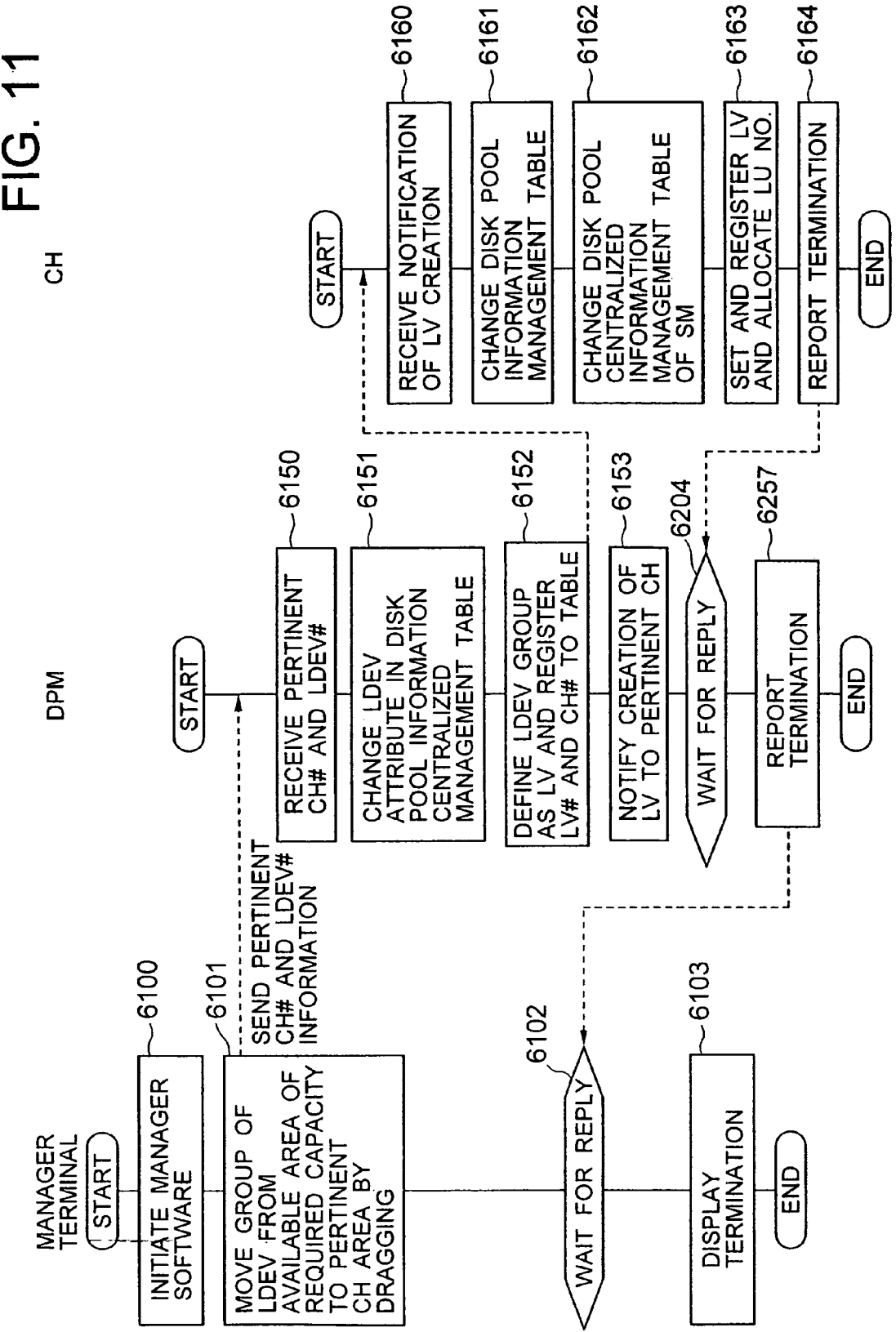
FIG. 11 is a flowchart showing operation of volume allocation processing.

FIG. 11 shows a flowchart of a procedure of the volume allocation processing.

When a new logical volume is allocated to a channel adapter (to be referred to as CHNi hereinbelow), the administrator of the storage system 1 initiates a manager software of the management terminal 18 (step 6100).

The administrator inputs information indicating CHNi and information of the logical volume to be allocated to CHNi to the management terminal 18. Concretely, when the management terminal 18 displays information including an icon for LDEV 180 in an area indicating as an available item on its display in response to an execution of the manager software, the administrator moves by a mouse or the like the icon to an area indicating CHNi on a screen of the display. In the operation, the administrator can simultaneously move a plurality of LDEV for required storage capacity on the screen. In the embodiment, it is assumed that the LDEV are beforehand set to the storage system 1 when the product is delivered to the user (step 6101).

The information of CHNi selected by the administrator and the information of LDEV 170 to be allocated to CHNi are sent from the terminal 18 to the disk pool manager 15. The disk pool manager 15 receives the information (step 6150).

Having received the information from the terminal 18, the disk pool manager 15 executes the disk pool manager program 1521.

The disk pool manager 15 determines a pool number associated with the specified LDEV 170 and processes the disk pool information centralized management table 1522 to change the item in the allocation destination CH information entry 1312 from "not allocated" to "CHNi" (step 6151).

Subsequently, the disk pool manager 15 allocates a new logical volume number LVj to the LDEV 170 and registers information items of the allocated logical volume to the LV number entry 1314 and the CN number entry 1315 of the table 1522 (step 6152).

The disk pool manager 15 then notifies via the management network 16 to the CHNi that the LDEV 170 has been added and has been defined as a logical volume LVj (step 6153).

Having received the notification (step 6160), the CHNi executes the disk pool information acquisition program 110048 to achieve processing as follows.

The channel adapter CHNi updates the information in the disk pool information management table 110049 of its own according to the information notified from the disk pool manager 15 (step 6161). The adapter CHNi also controls the shared memory 13 to update associated items in the disk pool information centralized management table 1311 stored in the shared memory 13 (step 6162).

Next, the channel adapter CHNi executes the disk volume control program 110045 to register to the disk information control table 110049 information to configure the allocated LDEV group as a logic volume LVj and information such as an LV number to use the allocated LDEV group as the volum LVj (step 6163).

Thereafter, the CHNi sends a termination report to the disk pool manager 15 (step 6164). Having received the report, the manager 15 sends the termination report to the management terminal 18 (step 6155). The volume allocation processing is then terminated.

Although a new volume is allocated in the description, a storage capacity may also be added to an existing volume LVp in similar processing. This processing differs from the processing described above in the following points. The administrator instructs LVp to add LDEV 170 via the screen of the terminal 18. Having received the instruction of addition of LDEV 170, the disk pool manager 15 changes the disk pool information centralized management table 1522 to add LDEV 170 to LVp and sends information of the change to CHNi. Having received the information of the change, CHNi changes the disk pool information management table 110049 and the disk pool information centralized management table in the shared memory 13.

The processing described above is similarly applicable to addition of a logical volume to a Fibre Channel adapter 1110.

Figure 12:
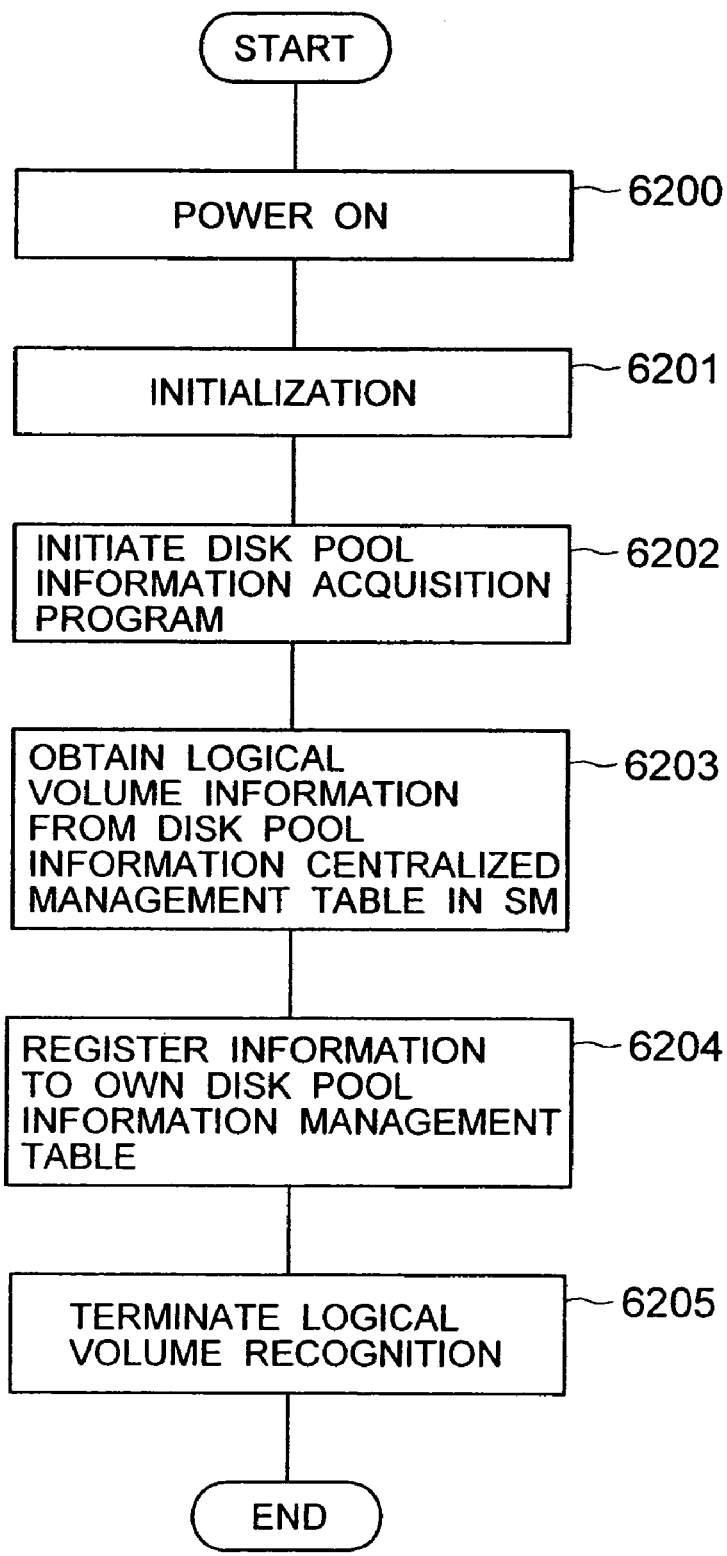
FIG. 12 is a flowchart showing operation of volume recognition processing.

FIG. 12 is a flowchart showing a procedure of the volume recognition processing executed by the channel adapter when the storage system 1 is initiated or when a channel adapter is additionally installed.

In response to an event that the storage system 1 is powered or that a channel adapter is added to the storage system 1 (step 6200), each channel adapter initializes itself (step 6201).

After the initialization is finished, each channel adapter starts execution of the disk pool information acquisition program 110048 (step 6202). Each channel adapter then refers to the disk pool information centralized management table 1311 in the shared memory 13 to acquire information of a logical volume to be used (step 6203).

When the information of the logical volume is obtained, the channel adapter registers the information to own disk pool information management table 110049 (step 6204). As a result of the processing, each channel adapter can recognize the logical volume allocated thereto (step 6205).

According to the control operation, each channel adapter can use any logical volume of the storage system 1 according to the information registered to the disk pool information centralized management table 1311 containing information of all logical volumes of the storage system 1 in a centralized fashion. Particularly, since the logical volumes are exclusively allocated in the embodiment to the channel adapters in the disk pool information centralized management table 1311 to avoid duplication of the allocation, each channel adapter can use the logical volume in an exclusive fashion.

The recognition processing is applicable to any channel adapters regardless of the channel adapter types such as a network channel adapter 1100 and a Fibre Channel adapter 1110.

In the description of the embodiment, the disks are subdivided into logical devices LDEV 170 to define a set of LDEV 170 as a logical volume LV. However, there may exist an embodiment in which the disks 1700 are not divided into LDEV 170. In this case, the entire storage capacity of one or more RG 17000 forms a disk pool 6 and a predetermined storage capacity thereof is allocated as a logical volume to the channel adapter.

According to the embodiment, there can be implemented a storage system including an arbitrary combination of a plurality of Fibre Channel adapters having the SAN or the block I/O interface and a plurality of network channel adapters having the NAS or the file I/O interface. It is therefore possible to construct a storage system having high scalability and a high degree of freedom for its configuration.

The setting of the storage areas of the storage system and the management and operation of the storage system can be conducted in a centralized manner by a single manager terminal. Therefore, the management and operation of the system is facilitated and the system management cost is reduced.

The user can safely use the storage capacity of a storage system including the SAN and the NAS by exclusively controlling the storage areas. Therefore, by managing the storage capacity in a centralized fashion, an easily accessible environment can be provided, and the storage capacity can be optimally distributed. This resultantly reduces the system management and operation cost.

Description will now be given of another embodiment of the present invention. In the embodiment described above, mutually different logical volumes are respectively allocated to the Fibre Channel adapters 1110 or the network channel adapters 1100. However, a logical volume is allocated to a plurality of channel adapters in this embodiment. Description will be given of a method of managing the disk pool and a method of sharing the logical volume.

In the embodiment, intra-CH sharing information items 1317 to 1319 shown in FIG. 9 are used. The information items 1317 to 1319 are set for each of the disk pool 6, the RAID group 17000, and the logical volume.

The intra-CH sharing information mainly includes information of three attributes as follows.

(1) Readable/writable sharing attribute (R/W)
(2) Read-only sharing attribute (R)
(3) Sharing prohibision attribute (P)

These attributes are hierarchically ordered as P>R>R/W. Once the attribute is set to logical volumes, the attribute can not be changed to an attribute of a higher level. That is, when R is set to a logical volume, R can be changed to P. However, the attribute R cannot be changed to the attribute R/W. Assume that a logical volume for which the sharing is once prohibited can be changed to a sharable logical volume. For example, in a case in which a logical volume is used by assuming that a channel adapter exclusively use the logical volume, when the attribute of the logical volume is change to the read-only sharing attribute (R) or the like, there may occur a case in which data to be kept secret is open to the public. Therefore, the data is changed, and logical inconsistency occurs depending on cases.

When it is desired to set a lower attribute to a logical volume having a higher attribute, the user must once delete the logical volume to return the storage area such as LDEV allocated to the logical volume to the disk pool 6. The user re-configures the logical volume again. Attributes other than those described above may also be set.

The intra-CH sharing information is taken over in a sequence of "disk pool 6">"RG 17000">"LV or LDEV 170". That is, sharing information of a higher level (the disk pool is at the highest level) takes precedence over sharing information of RG 17000 and LDEV at a lower level. Sharing information of RG 17000 takes precedence over sharing information of LDEV 170.

When the disk pool 6 has the sharing prohibition attribute (P), the associated items of a lower level such as RG 17000 have also the sharing prohibition attribute. Therefore, the storage areas of the disk pool 6 in the storage system 1 cannot be shared at all. Since the sharing prohibition attribute has the highest level, an attribute of a lower level cannot be individually assigned to the associated items of a lower level such as RG 17000. When the disk pool 6 has the R/W attribute, the associated items of a lower level such as RG 17000 have also the R/W attribute. Therefore, the storage areas of the disk pool 6 in the storage system 1 can be shared. In this case, an attribute of a lower level can be individually assigned to the associated items of a lower level such as RG 17000.

As above, by setting the possibility of the sharing to each logical level of storage areas of the storage system such as the disk pool 6 and RG 17000, it is possible at allocation of a logical volume to completely prohibit or allow the sharing of the storage areas of the storage system 1. Therefore, volume allocation is facilitated and strength of security can be controlled.

Next, description will be given of the setting of a volume to be shared between channel adapters in several cases.

Description will be given of two modes in a case in which a single logical volume is shared between a Fibre Channel adapter 1110 and a network channel adapter 1100, namely, between a SAN and a NAS.

The first mode is called "NAS over SAN". In this mode, for a file system created in a logical volume allocated to a network channel adapter 1100, a computer outside the storage system 1 sends a file access request via the LAN 20 to the channel adapter 1100. The computer having issued the request communicates data via the SAN 30.

The second mode is called "backup via SAN". In this mode, a backup operation for data stored in a logical volume allocated to the network channel adapter 1100 to create a file system is conducted via a SAN connected to the Fibre Channel adapter 1110.

These examples are associated with the SAN-SAN sharing, specifically, the sharing of a logical volume between computers. Therefore, the S-N sharing information 1317 of the intra-CH sharing information is used.

In FIG. 9, a logical volume 8 including the disk pool 6 (1), RG 17000 (2), and LDEV 170 (6 to 8) is defined as a logical volume shared between a computer associated with SAN and a computer associated with NAS. This can be seen from that a plurality of types of channel adapters are registered to the channel adapter number entry 1316.

The S-N sharing information entry 1317 corresponding to LV 8 contains information that disk pool 1 is R/W, RG2 is R/W, and LV 8 is R/W. In the same RG 17000 of the same disk pool, the attribute of any logical volume other than LV 8 has been changed to the P attribute. That is, the sharing is prohibited for such logical volumes. The R/W attribute is set to LDEV 170 not used, i.e., reserved.

The sharing attribute is set to the disk pool 6 when the disk pool 6 is defined. The attribute is set to RG 17000 when RG 17000 is registered to the disk pool 6. The attribute is set to LV and LDEV when the volume allocation processing is executed. The user inputs specific setting information from the management terminal 18.

The SAN-SAN (S-S) sharing information and the NAS-NAS (N-N) sharing information are also respectively set to the entries 1318 and 1319 in a similar way.

In the description of the embodiment, attributes having a plurality of levels are set to share a logical volume. Next, description will be given of further another embodiment of the present invention. In addition to the above attributes, an attribute having a plurality of levels is set to each user who accesses a logical volume. When a user desires to access the logical volume, the user is restricted according to the attribute level. In the description, the logical volume is shared between network attached storages (NAS).

In FIG. 9, the user class sharing information entry 1320 in the disk pool information centralized management table 1311 (1522) has a subentry for each attribute (user class) associated with the user.

Five user classes are as follows.
(1) Everyone: All users (E)
(2) Company: Users in the same enterprise (C)
(3) Domain: Users in the same domain (E)
(4) WorkGroup: Users in the same work group (W)
(5) UserGroup: Users in the same user group (U)

In general, the numbers of users belonging to the respective user classes (1) to (5) are sequentially ordered as (1) to (5) in a descending order.

To each user class, an attribute similar to the intra-volume sharing attribute described in the second embodiment, namely, the attribute R/W, R, or P is assigned. The meaning of each attribute, levels thereof, operation to take over the attribute, and possibility to change the attribute are substantially equal to those described in the second embodiment, and hence description thereof will be omitted.

Description will be given of the sharing operation using logical volume (LV) 0 shown in FIG. 9. The user class sharing information entry 1320 has subentries of E=P, C=R, D=R, W=R/W, and U=R/W. That is, any user of the same user group or the same work group can conduct read and write operations for the logical volume 0. The other users, namely, the users in the same domain or firm cannot change the contents of the logical volume.

The user class sharing attribute is set to the disk pool 6 when the disk pool 6 is defined. The attribute is set to RG 17000 when RG 17000 is registered to the disk pool 6. The attribute is set to LV and LDEV when the volume allocation processing is executed. The user instructs the setting of the attribute from the manager terminal 18.

For the management of users, the storage system 1 must have a user class definition information table containing information for each user, for example, information indicating a name of group of one of the user classes 1 to 5 to which the user belongs. For each logical volume, the user information is registered to the user class definition table.

Specifically, since the NAS includes a unit to manage users for each file system, the user must set user management information to the network channel adapter 1100. When the user information is set to the adapter 1100, the user class definition information table is generated.

According to the embodiment, when a logical volume is set to the storage system 1, the administrator selects an appropriate user class. As a result, security can be set at a logical volume level corresponding to the user class. Even if a user of a user class not allowed to access the logical volume attempts to access the volume, the user is checked for authentication for each logical volume according to the above function, and hence the access request from the user not having the access permission is rejected.

By the security function, it is possible to guarantee access security in a system in which one storage system 1 of a large size is installed in a data center and a plurality of firms share one disk pool.

Since the NAS inherently includes the user management function, the embodiment can be easily applied to the NAS. By installing the user management function of this embodiment in the SAN, it is also similarly possible to implement the disk pool management and the volume allocation while guaranteeing the access security between the user classes.

In the description of the embodiment, the access security between user classes is guaranteed in one channel adapter. However, it is also possible to implement an embodiment in which the configuration to share a volume between channel adapters as described above is combined with the configuration to guarantee the access security between user classes. That is, the storage system 1 provides a service in which the system 1 allows only a user of an appropriate user class to access a volume while the volume is shared between multiple channel adapters.

According to the present invention, the management and operation cost of the storage system can be reduced.

According to the present invention, there can be provided a storage system of which the storage capacity is easily managed.

According to the present invention, it is possible to increase the flexibility of the storage system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system, comprising:
   a plurality of interface control devices each of which is coupled to a client computer; and
   a plurality of disk devices coupled to said plurality of interface control devices;
   wherein storage areas in said plurality of disk devices are divided into a plurality of pools based on characteristic of said storage areas, at least one storage area in one of the pools being assigned to each of said interface control devices, each storage area in said plurality of pools being accessed via the interface control device to which the storage area is assigned;
   wherein one of said interface control devices is a channel adapter board of a file I/O interface and another one of said interface control devices is a channel adapter board of a block I/O interface;
   wherein said at least one storage area includes a first storage area and a second storage area, the first storage area being provided to a first client computer via the channel adapter board of a block I/O interface and the second storage area being provided to a second client computer via the channel adapter board of a file I/O interface; and
   wherein a first memory unit is further provided in the storage system for storing disk pool information indicating an assignment of a storage area to each interface control device, said each interface control device including a second memory unit, wherein said each interface control device obtains information about the storage area assigned to the interface control device and stores the obtained information on said second memory unit so as to refer to said information when accessing said assigned storage area.

2. A storage system according to claim 1, wherein one of said plurality of pools comprises a shared storage area, which is assigned to a plurality of the interface control devices.

3. A storage system, comprising:
   a plurality of interface control devices each of which is coupled to a client computer; and
   a plurality of disk devices coupled to said plurality of interface control devices;
   wherein storage areas in said plurality of disk devices are divided into a plurality of pools based on characteristic of said storage areas, at least one storage area in one of the pools being assigned to each of said interface control devices, each storage area in said plurality of pools being accessed via the interface control device to which the storage area is assigned;
   wherein one of said interface control devices is a channel adapter board of a file I/O interface and another one of said interface control devices is a channel adapter board of a block I/O interface;
   wherein one of said plurality of pools comprises a shared storage area, which is assigned to a plurality of the interface control devices;
   wherein attribute information indicating sharing condition of the shared storage area is set in said storage system.

4. A storage system, comprising:
   a plurality of interface control devices each of which is coupled to a client computer; and
   a plurality of disk devices coupled to said plurality of interface control devices;
   wherein storage areas in said plurality of disk devices are divided into a plurality of pools based on characteristic of said storage areas, at least one storage area in one of the pools being assigned to each of said interface control devices, each storage area in said plurality of pools being accessed via the interface control device to which the storage area is assigned;
   wherein one of said plurality of pools comprises a shared storage area, which is assigned to a plurality of the interface control devices;
   wherein attribute information indicating sharing condition of the shared storage area is set in said storage system; and
   wherein attribute information of a storage area depends on sharing condition of a storage pool comprising said storage area.

5. A storage system, comprising:
   a plurality of interface control devices each of which is coupled to a client computer; and
   a plurality of disk devices coupled to said plurality of interface control devices;
   wherein storage areas in said plurality of disk devices are divided into a plurality of pools based on characteristic of said storage areas, at least one storage area in one of the pools being assigned to each of said interface control devices, each storage area in said plurality of pools being accessed via the interface control device to which the storage area is assigned; and
   wherein attribute information of each of the plurality of storage areas is set in said storage system, and wherein said attribute information depends on attribute information of a pool comprising said plurality of storage areas.

6. A storage system according to claim 5, wherein said attribute information indicates sharing condition of each of the plurality of storage areas between the interface control devices.

7. A storage system according to claim 6, wherein said plurality of interface control devices include different types of interface control devices, and said attributed information indicates sharing condition of each of the plurality of storage areas between the different type interface control devices.

8. A storage system according to claim 5, wherein said attribute information indicates access permission condition for users.

9. A storage system, comprising:
a plurality of interface control devices each of which is coupled to a client computer; and
a plurality of disk devices coupled to said plurality of interface control devices;
wherein storage areas in said plurality of disk devices are divided into a plurality of pools based on characteristic of said storage areas, at least one storage area in one of the pools being assigned to each of said interface control devices, each storage area in said plurality of pools being accessed via the interface control device to which the storage area is assigned; and
wherein said characteristic of said storage areas is characteristic of the disk devices which includes one of disk device performance and kind or type of redundancy; and
wherein each pool is configured to include storage areas of disk devices having a same characteristic.

10. A storage system according to claim 9, further comprising a memory unit storing disk pool information indicating an assignment between each storage area in said plurality of pools and each of said interface control devices,
wherein each storage areas in said plurality of pools is accessed via one of the interface control devices according to said disk pool information.

11. A storage system according to claim 10, wherein each of said interface control devices obtains information about a storage area, which is assigned to the interface control device, from said disk pool information in said memory unit, and recognizes the assigned storage area.

12. A storage system according to claim 9, wherein one of said interface control devices is a channel adapter board of a file I/O interface and another one of said interface control devices is a channel adapter board of a block I/O interface.

13. A storage system according to claim 9, wherein one of said plurality of pools comprises a shared storage area, which is assigned to a plurality of the interface control devices.

14. A storage system according to claim 13, wherein attribute information indicating sharing condition of the shared storage area is set in said storage system.

15. A storage system according to claim 14, wherein attribute information of a storage area depends on sharing condition of a storage pool comprising said storage area.

16. A storage system according to claim 9, wherein attribute information of each of the plurality of storage areas is set in said storage system, and wherein said attribute information depends on attribute information of a pool comprising said plurality of storage areas.

17. A storage system according to claim 16, wherein said attribute information indicates sharing condition of each of the plurality of storage areas between the interface control devices.

18. A storage system according to claim 17, wherein said plurality of interface control devices include different types of interface control devices, and said attributed information indicates sharing condition of each of the plurality of storage areas between the different type interface control devices.

19. A storage system according to claim 16, wherein said attribute information indicates access permission condition for users.

* * * * *